United States Patent [19]

Williams

[11] Patent Number: 5,676,117
[45] Date of Patent: Oct. 14, 1997

[54] LAWN MOWER POWERED BY ALTERNATIVE FUELS

[76] Inventor: Parke D. Williams, 14115 Broadfording Church Rd., Hagerstown, Md. 21740

[21] Appl. No.: 663,806

[22] Filed: Jun. 14, 1996

Related U.S. Application Data

[60] Provisional application No. 60/003,307, Sep. 6, 1995.

[51] Int. Cl.$^6$ .................................................... F02M 21/04
[52] U.S. Cl. ............................................. 123/527; 123/525
[58] Field of Search ............................... 123/525, 526, 123/527, 276 E

[56] References Cited

U.S. PATENT DOCUMENTS

| | | |
|---|---|---|
| 3,978,823 | 9/1976 | Simon. |
| 5,203,046 | 4/1993 | Shaw. |
| 5,325,838 | 7/1994 | Bennet. |
| 5,377,646 | 1/1995 | Chasteen. |
| 5,487,362 | 1/1996 | Welleu et al. ............ 123/526 |
| 5,542,398 | 8/1996 | Marcon .................... 123/527 |

FOREIGN PATENT DOCUMENTS

| | | |
|---|---|---|
| 1158934 | 7/1969 | United Kingdom. |
| 81/00282 | 2/1981 | WIPO. |
| 92/08888 | 5/1992 | WIPO. |

OTHER PUBLICATIONS

*Animal Waste Treatment & Utilization, Proceedings*, "Trail Use of Biogas as Fuel for Gasoline engines", Taiwain, China (1985).
*SAE Special Publication N. PT–48 355–73*, "Conversion of Two Small Utility Engines to LPG Fuel", Warrendale, PA (1995).

*Primary Examiner*—Erick R. Solis
*Attorney, Agent, or Firm*—Richard C. Litman

[57] ABSTRACT

A lawn mower which is powered by an engine that uses gaseous fuels, such as liquified petroleum gas (LPG), compressed natural gas (CNG) or liquified natural gas (LNG). It may be either built originally to use gaseous fuels, or it may be converted from using liquid hydrocarbon fuels such as gasoline or diesel fuel. It may also use a combination of gaseous and liquid hydrocarbon fuels. The lawn mower may be hand-pushed or be self-propelled. It may include a fuel injector having a cylindrical main body housing, a coupling connecting a fuel hose and the main body housing, a gaseous venturi retained within the main body housing, an air intake in the main body housing, a sleeve that can slide over the air intake, and a docking collar with a plurality of slots that fits over the main body housing.

9 Claims, 5 Drawing Sheets

LAWN MOWER POWERED BY ALTERNATIVE FUELS

CROSS REFERENCE TO RELATED APPLICATION

This application is based on Provisional Patent Application Ser. No. 60/003,307 filed Sep. 6, 1995.

BACKGROUND OF THE INVENTION

1. Field of the Invention

The present invention relates to a lawn mower powered by alternative, preferably gaseous fuels, e.g., liquified petroleum gas (LPG), compressed natural gas (CNG), liquified natural gels (LNG), or other gaseous hydrocarbon fuels.

2. Prior Art

Natural gas is a mixture of short-chain alkyl hydrocarbons and other gases, primarily methane, but also including ethane, propane and butane, that occurs naturally in underground chambers over petroleum deposits, and is also the lightest fraction formed when crude oil is processed. Under low temperature it condenses to form a liquid, called liquified natural gas (LNG), in which state it occupies a smaller volume than in its gaseous state, so that it may be stored and transported economically. If kept under high pressure, which also reduces its volume, but still in a gaseous state, it is called compressed natural gas (CNG). Liquified petroleum gas (LPG) is a by-product of natural gas processing and crude oil refining. Because it is composed of the heavier hydrocarbons in natural gas, primarily propane and butane, it will liquify under pressure, but reverts to a gaseous state when the pressure is released, as in an engine. Pure propane may also be used as a gaseous fuel. The same amount of energy may be provided at a lower cost by gaseous fuels than by gasoline. Gaseous fuels may also burn more cleanly, thus reducing pollution to the earth's atmosphere.

While prior art references disclose engines and machines powered by gaseous hydrocarbon fuels, none discloses a lawn mower with an engine using gaseous fuels.

U.S. Pat. No. 3,978,823, issued to Michael Simon, on Sep. 7, 1976, discloses an LPG burning internal combustion engine, which is not included in or in any way connected with a lawn mower.

U.S. Pat. No. 5,203,046, issued to Patrick A. Shaw, on Apr. 20, 1993, discloses a floor buffing machine powered by propane engine, but does not teach or suggest the use of a propane or other gaseous fuel engine in a lawn mower.

U.S. Pat. No. 5,325,838, issued to David E. Bennett, on Jul. 5, 1994, discloses a liquified petroleum gas fuel injector for an internal combustion engine, but does not teach or suggest its use in a lawn mower.

U.S. Pat. No. 5,377,646, issued to Ronald E. Chasteen, on Jan. 3, 1995, discloses a gaseous fuel management system for an internal combustion engine, but does not teach or suggest its use in a lawn mower.

United Kingdom Patent Specification No. 1,158,934, published Jul. 23, 1969, discloses a method of conversion of fuel gases from the liquid to the gaseous phase.

PCT International Application No. WO 81/00282, published on Feb. 5, 1981, discloses a fuel supply system for internal combustion engines using liquified petroleum gas.

PCT International Application No. WO 92/08888, published on May 29, 1992, discloses a dual fuel injection system and a method of controlling such a system. The first fuel may be gasoline and the second fuel may be a liquified gas.

It may be seen that none of the above-mentioned prior art references teaches or suggests the use of liquified petroleum gas, compressed or liquified natural gas, or a similar fuel, or an engine powered by such a fuel, in a lawn mower.

SUMMARY OF THE INVENTION

The present invention is a lawn mower which is powered by gaseous fuels. It may be either built originally to use gaseous fuels, or it may be converted from using liquid hydrocarbon fuels such as gasoline or diesel fuel. It may also use a combination of gaseous and liquid hydrocarbon fuels. It may be pushed by hand or be a rider-mower. It is expected that the use of alternative, gaseous fuels in lawn mowers will reduce pollution and fuel costs.

Accordingly, it is a principal object of the invention to provide a lawn mower engine that will reduce pollution to the earth's atmosphere.

It is another object of the invention to provide a lawn mower engine that will reduce fuel costs.

It is a further object of the invention to provide means for converting a lawn mower from using liquid hydrocarbon fuels to using gaseous fuels.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Figure 1:
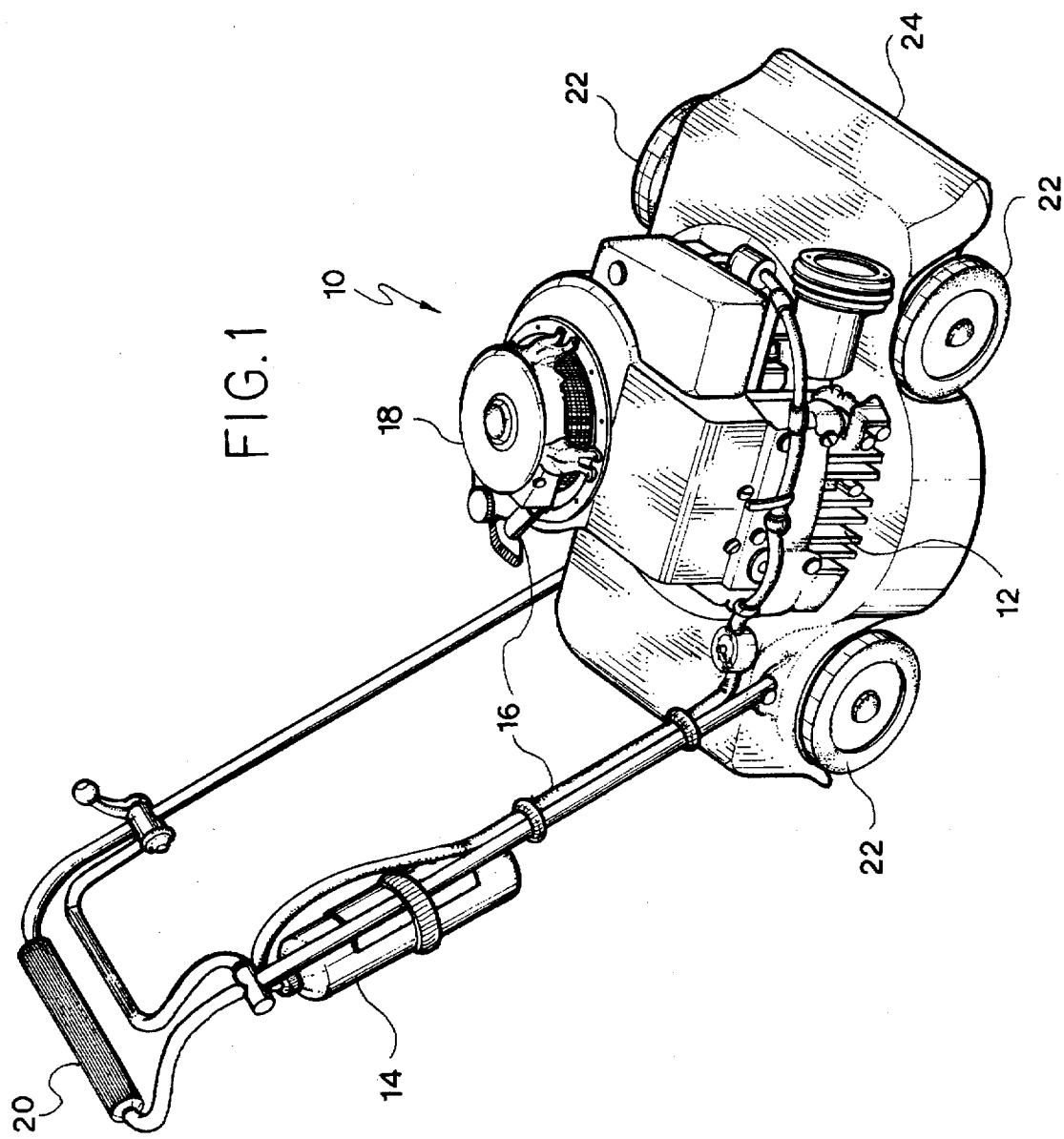
FIG. 1 is a perspective view of the first embodiment of the invention.

FIG. 1 shows the present invention in a first embodiment: an otherwise conventional lawn mower 10 powered by a four-stroke engine 12 that uses LPG as fuel, and that is either self-propelled or pushed by hand by the user. LPG is stored in a fuel tank 14, and transferred by a fuel line 16 having a gas regulator 17 to the carburetor 18, where it is mixed with air and conveyed to the engine. The lawn mower is pushed by a handle 20, rolls on wheels 22, and has blades to cut grass (not shown) under the cover 24. The engine may be an ordinary gasoline engine that is converted to use LPG, with the carburetor adjusted to create the optimum fuel-air mixture for LPG.

Figure 2:
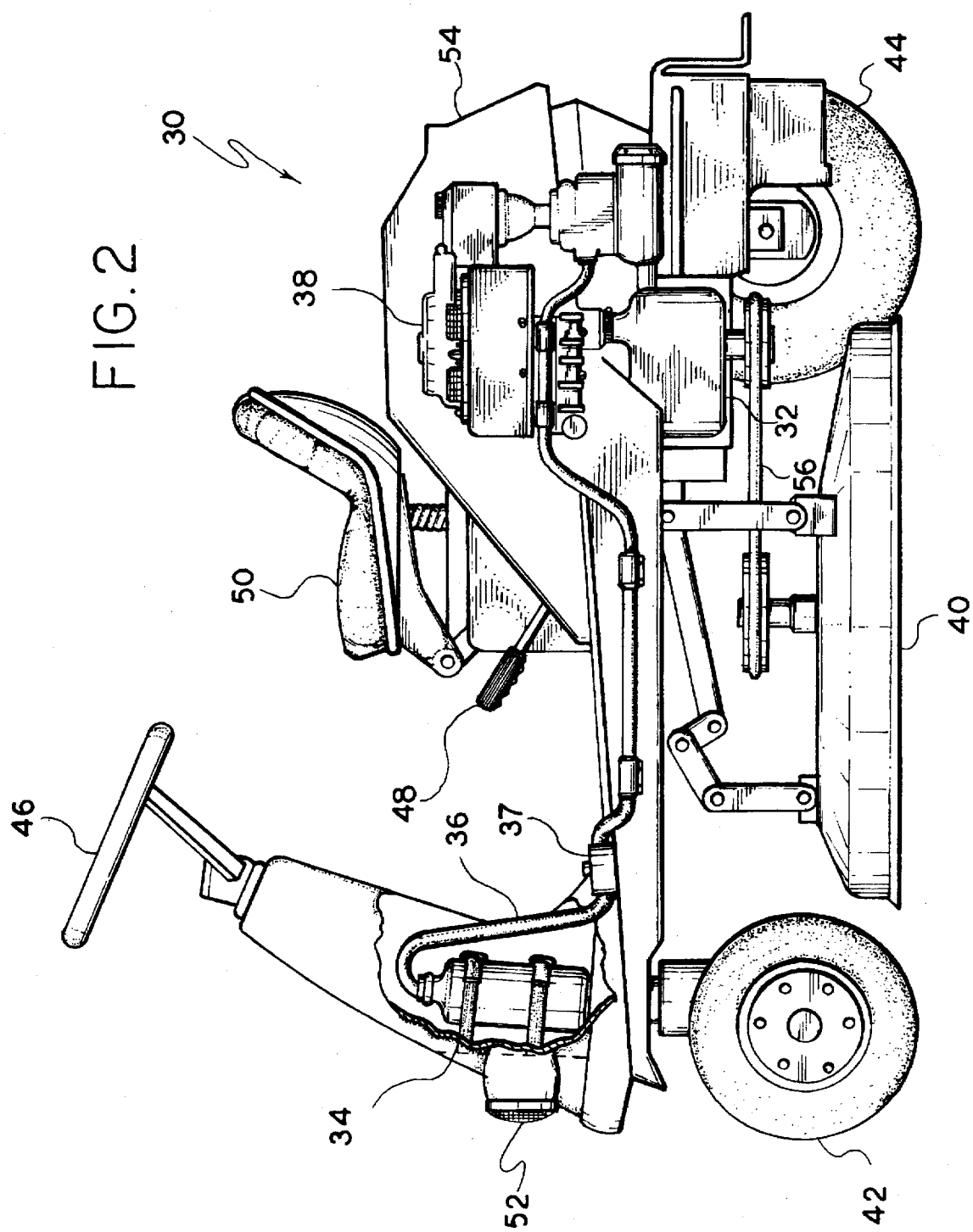
FIG. 2 is a perspective view of the second embodiment of the invention.

FIG. 2 shows the present invention in a second embodiment: a lawn mower 30 powered by a four-stroke engine 32 that uses LPG as fuel, and that is self-propelled, being ridden by the user. LPG is stored in a fuel tank 34, and transferred by a fuel line 36 having a gas regulator 37 to the carburetor 38, where it is mixed with air and conveyed to the engine. The lawn mower has blades to cut grass (not shown) under the cover 40. Also shown are a front wheel 42, a rear wheel 44, a steering wheel 46, a gear shift lever 48, a seat for the user 50, a headlight 52, a chassis 54, and a transmission 56 between the engine and the cutting blades. As in the first embodiment, the engine may be an ordinary gasoline engine that is converted to use LPG, with the carburetor adjusted to create the optimum fuel-air mixture for LPG.

Figure 3:
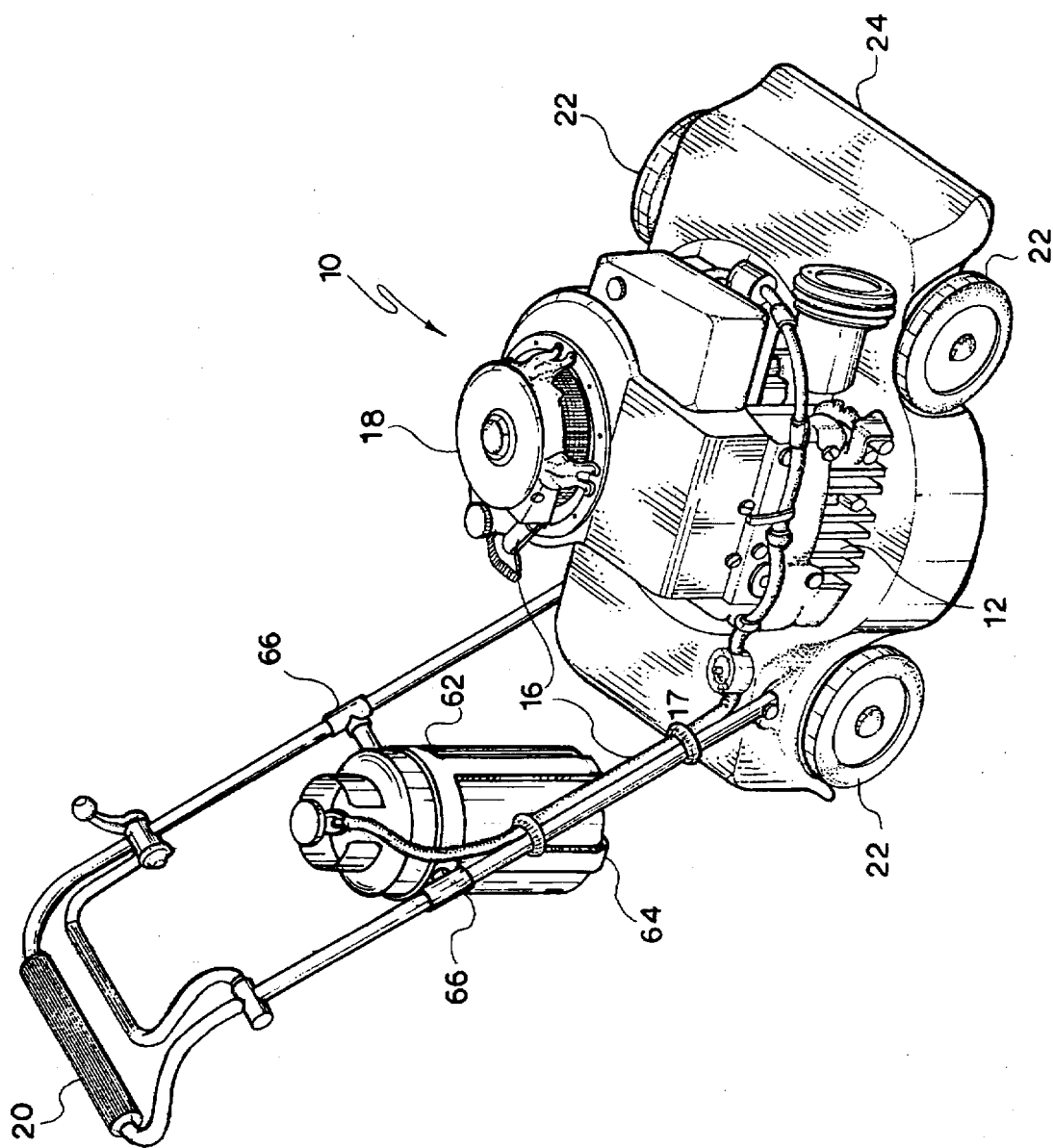
FIG. 3 is a perspective view of the third embodiment of the invention.

FIG. 3 shows the present invention in a third embodiment: an otherwise conventional lawn mower 10 powered by a four-stroke engine 12 that uses LPG as fuel, that is the same as the lawn mower in FIG. 1, except that the fuel tank 62 is retained in a cradle 64 that swings on pivotal connectors 66 attached to the handle of the lawnmower. As in the first embodiment, fuel passes through a fuel line 16 having a regulator 17 to the carburetor 18, where it is mixed with air and conveyed to the engine. The third embodiment has the advantage that the fuel tank may swing to a vertical position relative to the ground, regardless of the angle of the handle. This may make possible more efficient fuel use. By limiting the area in which the fuel tank swings, the cradle may reduce the risk of injury to the person pushing the mower.

Figure 4:
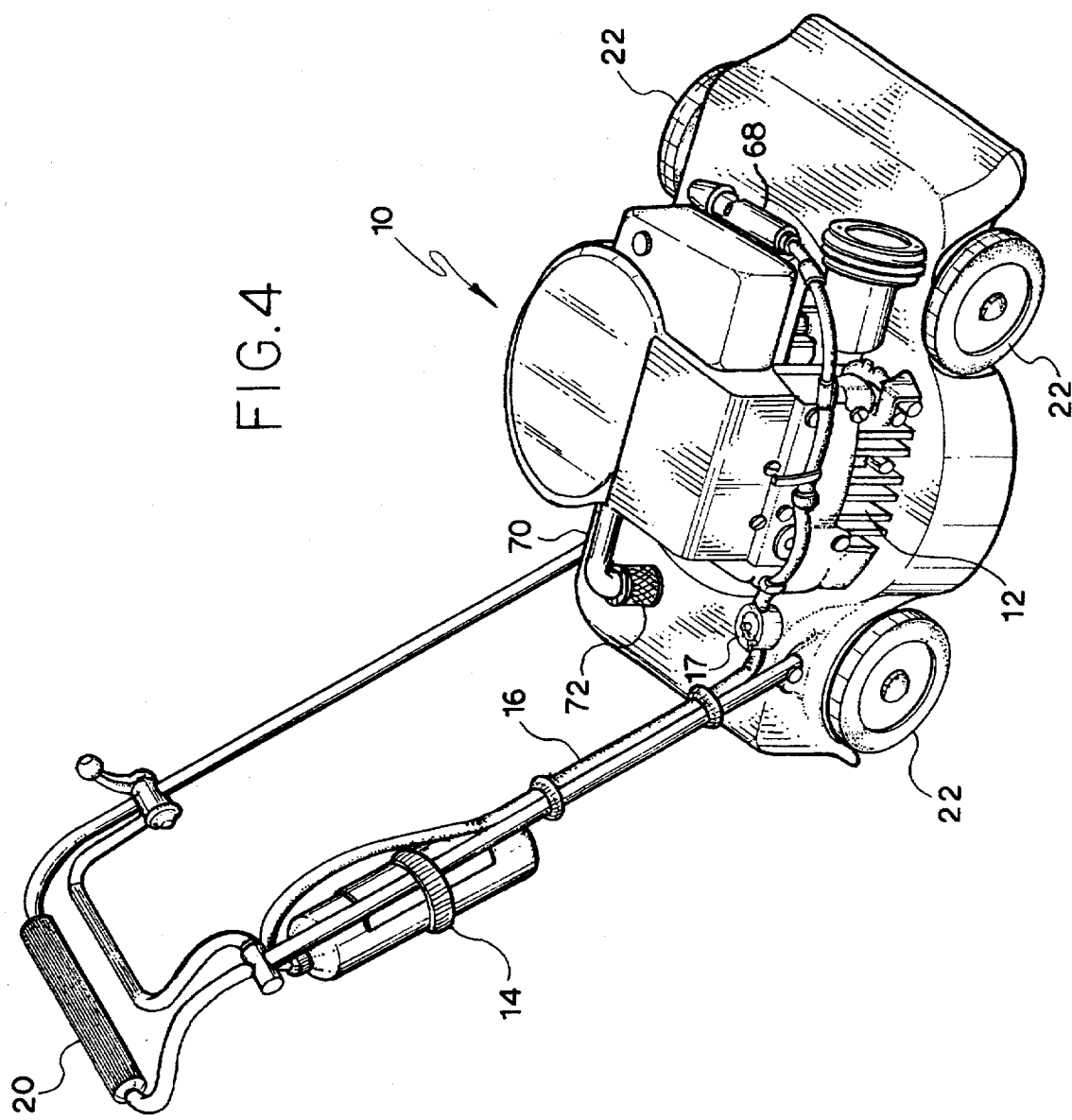
FIG. 4 is a perspective view of the fourth embodiment of the invention.

FIG. 4 shows the present invention in a fourth embodiment: an otherwise conventional lawn mower 10 powered by a four-stroke engine 12 that uses LPG as fuel, that is the same as the lawn mower in FIG. 1, except that the carburetor is replaced by a fuel injector 68, and there is an exhaust pipe 70 with a muffler 72 that releases exhaust under the cover 24. The fuel injector is designed to cause LPG to be burned more efficiently in the engine than it will be with a conventional gasoline carburetor.

Figure 5:
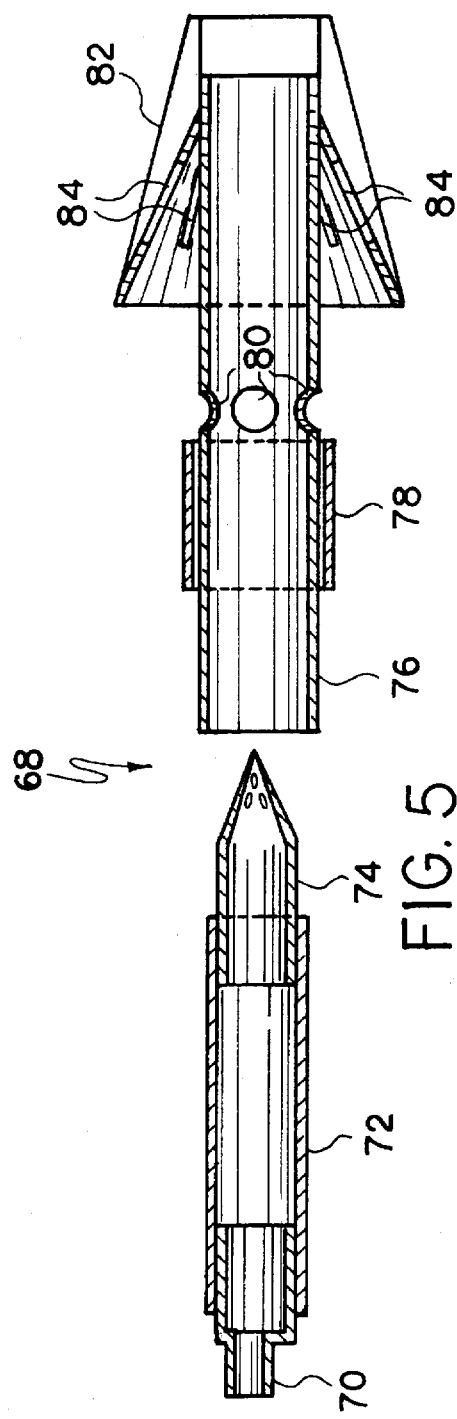
FIG. 5 is an exploded longitudinal cross-sectional view of the fuel injector used in the fourth embodiment of the invention.
Figure 7:
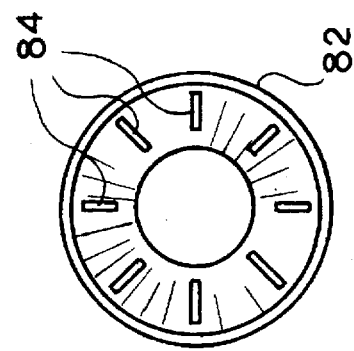
FIG. 7 an axial view of the docking collar of the fuel injector used in the fourth embodiment of the invention, as seen from the left side of FIGS. 5 and 6.
Figure 6:
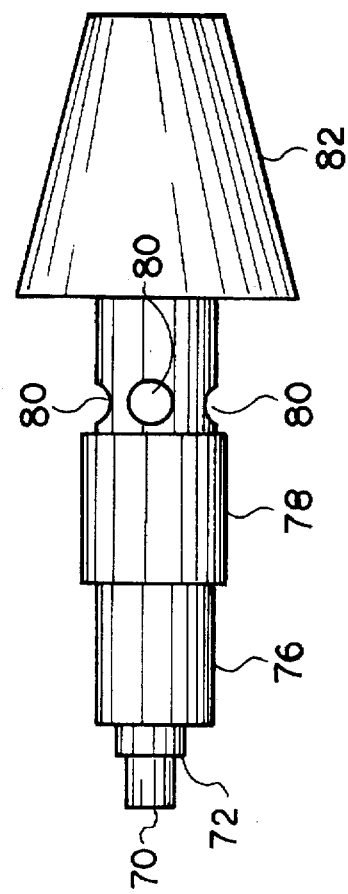
FIG. 6 is an assembled longitudinal cross-sectional view of the fuel injector used in the fourth embodiment of the invention.

FIG. 5 is an exploded longitudinal cross-sectional view of the fuel injector used in the fourth embodiment of the invention, showing a fuel hose coupling 70, a first main body housing member 72, a gaseous venturi 74, a second main body housing member 76, a sleeve 78 that can slide over the air intake holes 80, and a docking collar 82 with slots 84. FIG. 6 is an assembled longitudinal cross-sectional view of the fuel injector. FIG. 7 an axial view of the docking collar of the fuel injector, as seen from the left side of FIGS. 5 and 6.

It is to be understood that the present invention is not limited to the preferred embodiments described above, but encompasses any and all embodiments within the scope of the following claims.

I claim:

1. A lawn mower powered by an engine using gaseous fuel, said lawn mover including a fuel injector comprising:
    a cylindrical main body housing;
    a coupling connecting a fuel hose and the main body housing;
    a gaseous venturi retained within the main body housing;
    an air intake in the main body housing;
    a sleeve that can slide over the air intake; and
    a docking collar with a plurality of slots that fits over the main body housing.

2. A lawn mower as in claim 1, wherein the gaseous fuel is liquified petroleum gas.

3. A lawn mower as in claim 1, wherein the gaseous fuel is compressed natural gas.

4. A lawn mower as in claim 1, wherein the engine is converted from using liquid hydrocarbon fuel to using gaseous fuel.

5. A lawn mower as in claim 1, wherein the engine is a gasoline engine converted to use gaseous fuel.

6. A lawn mower as in claim 5, wherein the lawn mower has a gas regulator.

7. A lawn mower as in claim 1, wherein the lawn mower is selected from the group consisting of a self-propelled mower and a hand-pushed mower.

8. A lawn mower as in claim 4, wherein the lawn mower is a hand-pushed mower, having a fuel tank suspended from a handle by which the mower is pushed.

9. A mower having an internal combustion engine as its principal power plant, fueled by one or more of a plurality of alternative fuel supplies, with at least one of the fuels being a gaseous fuel, said mower including a fuel injector comprising:
    a cylindrical main body housing;
    a coupling connecting a fuel hose and the main body housing;
    a gaseous venturi retained within the main body housing;
    an air intake in the main body housing;
    a sleeve that can slide over the air intake; and
    a docking collar with a plurality of slots that fits over the main body housing.

* * * * *